United States Patent

Vossen, Jr. et al.

[15] 3,640,812

[45] Feb. 8, 1972

[54] METHOD OF MAKING ELECTRICAL CONTACTS ON THE SURFACE OF A SEMICONDUCTOR DEVICE

[72] Inventors: John Louis Vossen, Jr., Bedminster; Joseph Henry Banfield, Plainfield, both of N.J.

[73] Assignee: RCA Corporation

[22] Filed: Sept. 2, 1970

[21] Appl. No.: 68,909

[52] U.S. Cl. ..........204/192
[51] Int. Cl. ..........C23c 15/00
[58] Field of Search ..........204/192, 298

[56] References Cited

UNITED STATES PATENTS

| | | | |
|---|---|---|---|
| 3,479,269 | 11/1969 | Byrnes et al. | 204/192 |
| 3,121,852 | 2/1964 | Boyd et al. | 204/192 |
| 3,492,215 | 1/1970 | Conant | 204/192 |
| 3,324,019 | 6/1967 | Laegreid et al. | 204/192 |
| 3,233,137 | 2/1966 | Anderson et al. | 204/192 |
| 3,325,393 | 5/1964 | Darrow et al. | 204/192 |
| 3,271,286 | 2/1964 | Lepselter | 204/192 |

OTHER PUBLICATIONS

Vossen et al., "Back Scattering of Material Emitted from RF-Squattered Targets," RCA review, June 1970, Vol. 31, No. 2, pgs 293-305.

*Primary Examiner*—John H. Mack
*Assistant Examiner*—Sidney S. Kanter
*Attorney*—Glenn H. Bruestle

[57] ABSTRACT

The semiconductor device and a metal backing plate are simultaneously sputter etched so that some of the backing plate metal is back scattered onto the device and forms a thin metal-semiconductor alloy region in the semiconductor contact openings. At least one layer of electrode metal is then deposited on the device surface and the alloy regions. Part of the metal layer is then removed to define the desired electrode leads.

12 Claims, 10 Drawing Figures

INVENTORS
JOHN L. VOSSEN, JR. &
JOSEPH H. BANFIELD
BY D J Hoffman
Attorney

INVENTORS
JOHN L. VOSSEN, JR. &
JOSEPH H. BANFIELD
BY D J Hoffman
Attorney

METHOD OF MAKING ELECTRICAL CONTACTS ON THE SURFACE OF A SEMICONDUCTOR DEVICE

BACKGROUND OF THE INVENTION

This invention relates to semiconductor devices and, more particularly, to a method of making low-resistance electrical contacts to a semiconductor device.

Heretofore, it has been difficult to make a good low-resistance contact to a semiconductor device due to the thin native oxide layer on the surface of the semiconductor. Usually, the contacts are formed by depositing a layer of metal on the device surface, and then selectively removing the metal to define the desired electrode pattern. However, the deposited metal does not penetrate the thin native oxide layer and it does not form an adequate mechanical or electrical bond with the semiconductor material below. Consequently, further processing steps are required to obtain a sufficient bond between the deposited metal and the semiconductor material below.

In many types of semiconductor devices, the deposited metal is bonded to the semiconductor by heating it to a high temperature so that it is sintered into the semiconductor material below. However, the sintering process is dependent upon the metal spiking through defects in the native oxide layer, and this varies greatly from contact to contact. Thus, there is a substantial variation between the resistance of similar contacts, and it is very difficult to fabricate a device with a reproducible contact resistance. Additionally, the native oxide particles remain in the metal-semiconductor interface after the sintering is completed, and this substantially increases the contact resistance.

In other types of semiconductor devices, such as beam-lead structures, the semiconductor contact openings are specially treated before the primary metal electrode layers are deposited thereon. In these devices, a thin metal-semiconductor alloy, or "seed," region is first formed at the exposed semiconductor surface of the contact openings. The "seed" region penetrates through the thin native oxide layer and forms a metal alloy surface in the contact openings which will form a good bond with the subsequently deposited metal electrode layers. In a typical beam-lead silicon device, the "seed" region is formed by sputtering a layer of platinum over the entire device surface including the contact openings. The device is then heated to approximately 750° C. while in the vacuum system to sinter the platinum through the native oxide and into the silicon to form a platinum silicide "seed" region in the contact openings. The device is then cooled, removed from the vacuum system, and etched in aqua regia to remove the remainder of the platinum from the device surface.

Although the "seeding" process provides an improved bonding surface for the metal electrodes, it has several serious disadvantages. First, the metal has to be sintered through the native oxide to form an alloy contact, and the sintering process takes from 1 to 2 hours to heat and cool the device at such a high temperature in a vacuum. The large amount of time expended is very costly in a batch processing operation; and, as a result, the "seeding" process is the most expensive part of the metallization process. Also, the "seeding" process requires the use of an additional vacuum system which further increases the cost of the batch processing operation. Additionally, the high-temperature heating cycle is damaging to the vacuum system and it requires frequent repairs and replacements of the heating and cooling apparatus in the vacuum system.

DESCRIPTION OF THE PREFERRED EMBODIMENT

Figure 1:
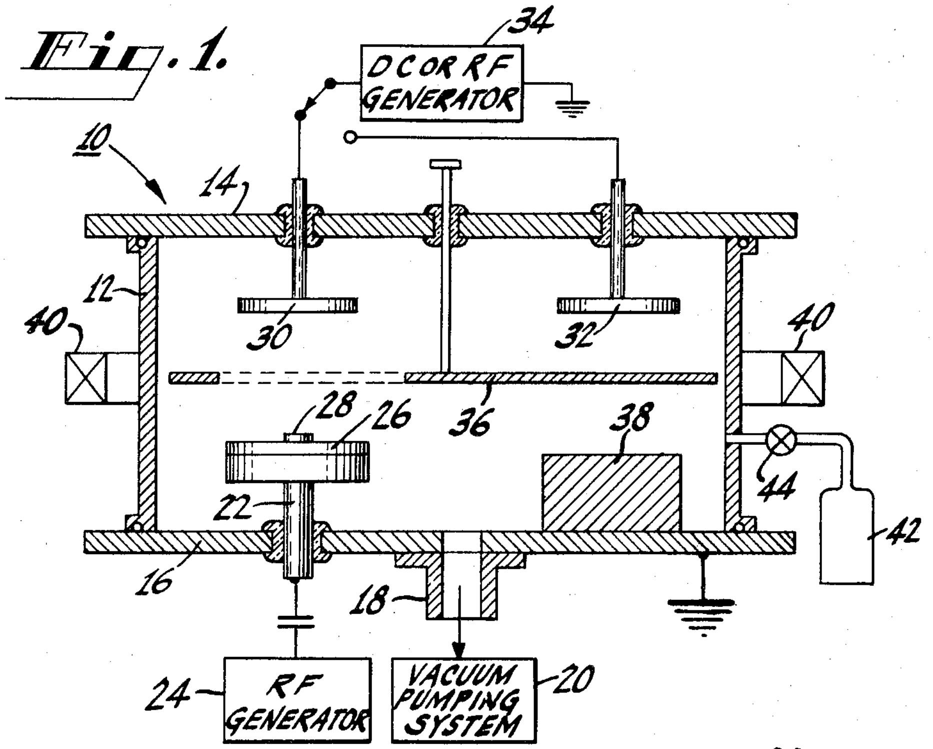
FIG. 1 is a cross-sectional schematic view of vacuum apparatus which can be used in the present invention.

FIG. 1 is a cross-sectional schematic view of a typical vacuum system 10 which can be used in the practice of the present invention; the system is particularly designed for the fabrication of beam-lead structures. The vacuum system 10 includes a cylinder 12 enclosed by top and base plates 14 and 16, respectively. The baseplate 16 has a flanged opening 18 which is connected to a vacuum pumping system 20. A substrate support fixture 22 is mounted on the base plate 16 inside the cylinder 12 and is electrically connected to an RF-generator 24. A metal backing plate 26 is mounted on the support fixture 22, and the desired semiconductor devices 28 are placed on the upper surface of the backing plate 26. A pair of sputtering targets 30 and 32 are attached to the top plate 14 and are separately connected to a DC or RF-generator 34 as desired by way of a switch 35. The first target 30 is positioned above the semiconductor devices 28 on the backing plate 26, and the second target 32 is positioned on the other side of the chamber 10 above a substrate platform 38 mounted on the baseplate 16. Mechanical means (not shown) are also provided for transferring the semiconductor devices 28 from the support fixture 22 to the platform 38 so that they may be sputtered by the second target 32. A rotating shutter 36 is suspended from the top plate 14 and is disposed between the targets 30 and 32 and the semiconductor devices 28 below so that the sputter deposition on the devices 28 may be accurately regulated. Additionally, a magnetic field coil 40 may be positioned around the cylinder 12, and a sputtering gas supply 42 is admitted to the cylinder 12 by a regulator 44.

In the present method, the desired parts of the semiconductor surface are first "seeded" or alloyed, before the primary metal electrode layers are deposited thereon. The "seed," or alloy, regions have a very low-contact resistance; and, therefore, form either ohmic or Schottky-barrier contacts, as desired, where the type of contact formed is primarily dependent upon the impurity doping level of the semiconductor material. The following examples further describe and explain the formation of both types of electrical contacts.

EXAMPLES 1

Figure 2:
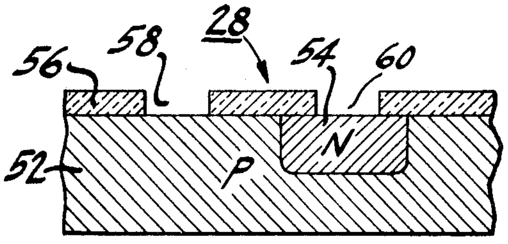
FIG. 2 to 5 are cross-sectional schematic views of a typical semiconductor device being metallized according to the present invention.

In this example, a beam-lead ohmic contact is to be formed on a partially fabricated silicon semiconductor device 28, as shown in FIG. 2. The device 28 includes a typical diode with *p* and *n* regions 52 and 54 having impurity dopant concentrations of about $10^{19}$atoms/cm.$^3$ at their surfaces. An insulating layer 56 of silicon dioxide is disposed on the device surface and has contact openings 58 and 60 cut therein to expose portions of the semiconductor regions 52 and 54 below.

The partially fabricated semiconductor device 28 is placed on the metal backing plate 26 as shown in FIG. 1, and the vacuum system is pumped down to a pressure of about $10^{-6}$ millitorr by the vacuum pumping system 20. A partial pressure of the sputtering gas 42 is then fed into the vacuum system 10 through the valve 44. Preferably, an inert gas, such as argon, should be used at a pressure of 20 to 40 millitorr.

The backing plate 26 is made of the same metal which is to be alloyed into the semiconductor contact openings 58 and 60 for reasons further discussed below. In accordance with most beam-lead structures, platinum has been selected for the metal to be alloyed into the contact openings; and, accordingly, the backing plate 26 is also made of platinum. However, any other metal could also be alloyed into the semiconductor if desired by substituting the other metal for the backing plate 26.

The RF-generator 24 is then capacitively coupled to the support fixture 22 as shown in FIG. 1, so that the platinum backing plate 26 and the device 28 are simultaneously sputter etched by the argon gas ions. The RF-generator 24 induces a negative potential on the surfaces of the backing plate 26 and the device 28, and this accelerates the positive ions of the sputtering gas toward them with sufficient energy to sputter etch their surfaces. Best results are obtained with an average DC potential (RF-induced) of −400 to −600 volts; and preferably, about −500 volts. Additionally, the magnetic field coil 40 is operated at a field of between 10 and 25 gauss to increase and concentrate the intensity of the sputter bombardment.

Figure 3:
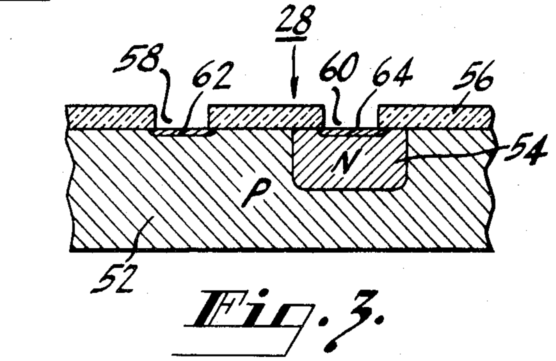

As the surfaces of the backing plate 26 and the devices 28 are sputter etched, some of the platinum atoms are sputtered from the backing plate 26 and back scattered into the semiconductor contact openings 58 and 60. The platinum atoms penetrate into the semiconductor regions 52 and 54 to a very shallow depth and form very thin alloy regions 62 and 64 of randomly distributed platinum and silicon atoms at their surfaces; as shown in FIG. 3. The equivalent of about 5 to 10 monolayers of platinum are dispersed in the alloy regions 62 and 64 to a maximum depth of about 20 monolayers, or 50A. Also, most of the native oxide is quickly sputter etched from the contact openings 58 and 60 when the sputtering beings, and the remainder of the oxide is randomly scattered between the platinum and silicon atoms. After about 10 minutes, an equilibrium condition develops between the material being sputtered away and back scattered onto the device surfaces. Afterwards, the composition of the alloy regions 62 and 64 becomes constant and is primarily made up of platinum and silicon atoms which form a high quality metal-to-semiconductor bond without the thin native oxide layer being disposed in-between.

Figure 6:
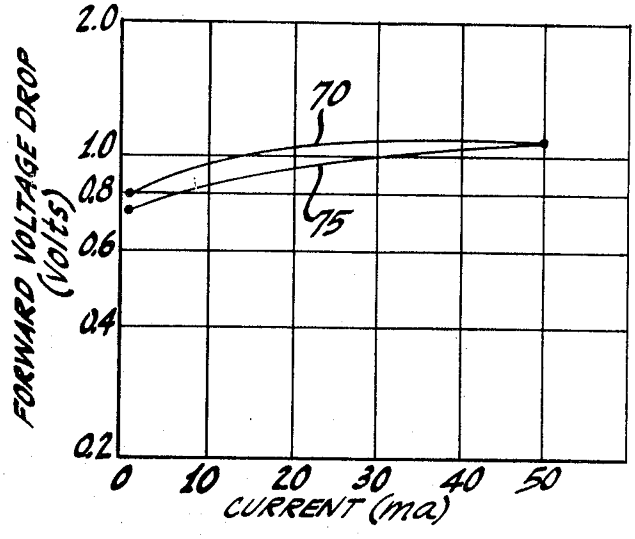
FIG. 6 is a graph which compares the resistance of an ohmic contact of the present invention with a similar prior art contact.

The absence of the oxide layer also produces a very low-contact resistance which helps to insure that the theoretical properties of the metal-to-semiconductor bond are achieved. In the present example, the semiconductor regions 52 and 54 have a high-impurity doping level of about $10^{19}$cm.$^3$, and low-resistance ohmic contacts are formed. FIG. 6 is a graph which compares the forward voltage drop (and related contact resistance) of the present alloyed contact, curve 75, with a similar prior art platinum contact curve 70 which was first sputter deposited and then sintered. As shown in FIG. 6, the present contact has a lower voltage drop at low currents and a comparable voltage drop at high currents.

The back scattering equilibrium condition exists across the entire surface of the device 28; and, uniform quality, oxide-free alloy regions 62 and 64 are formed anywhere on the device 28 surface, as desired. The relative size and position of the device 28 on the backing plate 26 are not critical, and any number of devices may be sputter etched at one time as long as a substantial portion of the backing plate 26 surface is exposed and the devices 28 are not placed too close to its edge.

Figure 7:
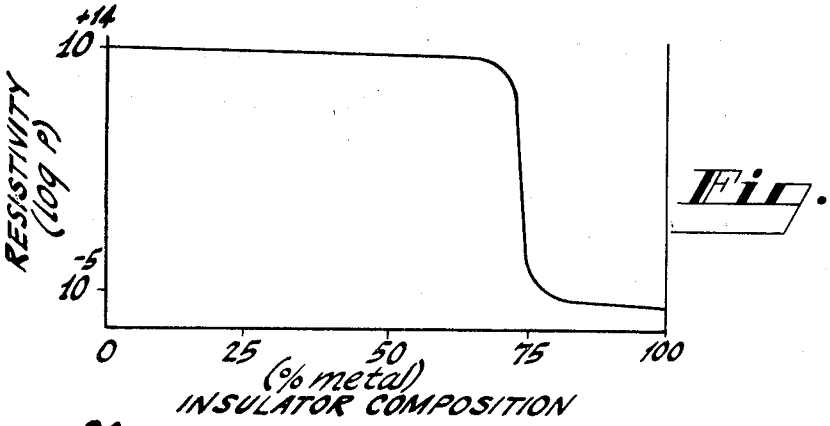
FIG. 7 is a graph which plots the resistivity of an insulator as a function of the percentage of metal therein.

Additionally, the present device 28 does not have to be subsequently etched to remove unwanted platinum from its surface after the formation of the platinum alloy in the contact openings 58 and 60. Although the present sputter etching process also back scatters platinum atoms onto the insulating layer 56, as well as the contact openings 58 and 60, the relatively few platinum atoms have virtually no effect on the resistivity of the insulating layer 56. As shown in FIG. 7, which plots the resistivity of the insulator as a function of the percentage of metal present, there is no change in the resistivity of the insulator until it is more than 75 percent metal; however, the maximum percentage of back scattered platinum atoms even at the surface of the insulator is only about 50 percent, and this is far short of the percentage necessary to change the resistivity of even the surface layer of the insulator.

Figure 4:
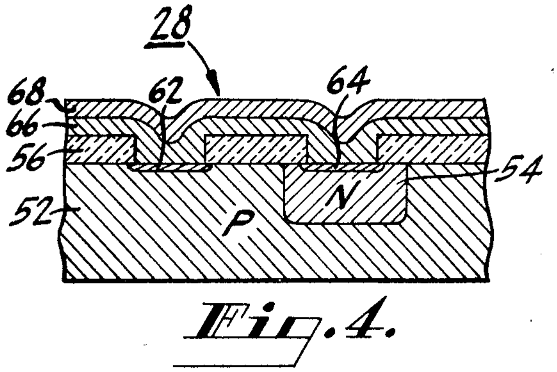
Figure 5:
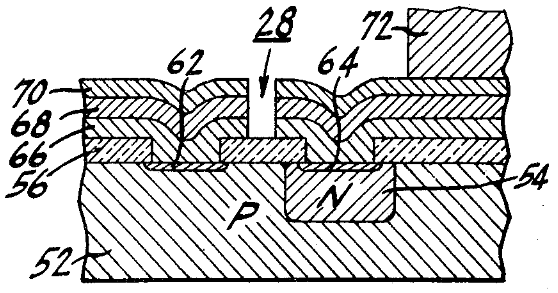

After the thin metal-semiconductor alloy regions 62 and 64 are formed in the semiconductor contact openings 58 and 60, the sputter etching is reduced or turned off and at least one layer of electrode metal is deposited on the device 28 surface and in the contact openings 58 and 60. In the present beam-lead device, consecutive layers of titanium 66 and platinum 68 are sputter deposited on the device surface as shown in FIG. 4. The shutter 36 is rotated open under the titanium sputtering target 30, and the target 30 is connected to the generator 34 for four minutes to sputter about 1,000A. of titanium 66 on the device 28 surface. The device 28 is then transferred to the platform 38, the shutter 36 is rotated, and the target 32 connected to the generator 34 for three minutes to sputter about 1,500A. of platinum 68 on top of the titanium 66. The device is then removed from the vacuum system 10 and the remainder of the beam-lead metallization is deposited and defined by any of the methods well known in the prior art. In the present example, two layers 70 and 72 of gold are electroplated thereon and defined to compete the metallization process, as shown in FIG. 5.

In the present invention, the alloy regions 62 and 64 do not have to be sintered, and the primary metal electrode layers are deposited directly thereon. Consequently, there is no need for the costly and time-consuming heat cycle which is necessary in the sintering process. Additionally, all of the metal deposition steps are carried out in a single vacuum system instead of using a second vacuum system for the alloy sintering process. Thus, the present alloying process is much simpler and more economical than the prior art processes, and higher quality contacts are obtained as well.

EXAMPLE 2

Figure 8:
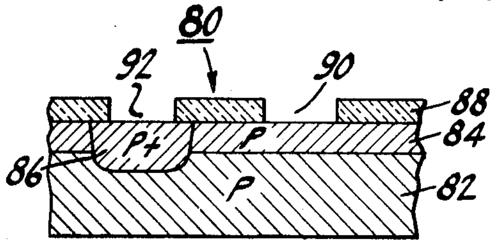
FIGS. 8 to 10 are cross-sectional views of Schottky-barrier contact being formed on a typical semiconductor device according to the present invention.

In this example, a Schottky-barrier diode is to be formed on a partially fabricated silicon semiconductor device 80, as shown in FIG. 8. The device includes a *p*-type substrate 82 and a *p*-type epitaxial layer 84 having a low-doping level of about $10^{18}$/cm.$^{3}$. A *p*+ region 86 having a high-doping level of about $10^{20}$/cm.$^3$ is diffused through a small portion of the epitaxial layer 84 into the substrate 82 below. An insulating layer 88 is disposed on the surface of the epitaxial layer 84 and openings 90 and 92 are cut therein to expose portions of the epitaxial layer 84 and the *p*+ region 86.

Figure 9:
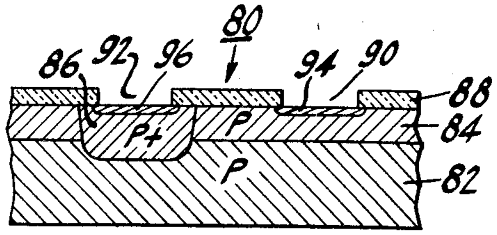

Platinum silicide alloy regions 94 and 96 are then formed in the contact openings 90 and 92, as shown in FIG. 9, by the same method described in the first example. However, the alloy region 94 forms a Schottky-barrier contact due to the low-doping level of the epitaxial layer 84, while the alloy region 96 forms an ohmic contact with the highly doped *p*+ region 86. The Schottky-barrier contacts of the present invention are also of high quality and low resistance. As described above, the native oxide layer is removed from the contact openings, and the back scattered metal makes a good alloy contact across the entire surface of the contact opening. The present Schottky-barrier contacts consistently have a measured barrier height of 0.55 e.v., which matches the theoretical barrier height for platinum on silicon of 0.55 e.v., whereas the measured barrier height of prior art devices is difficult to control and ranges anywhere from about 0.55 e.v. to about 0.8 e.v. and usually averages between 0.6 and 0.7 e.v.

Figure 10:
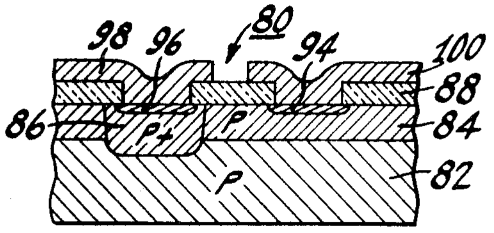

At least one layer of metal is then deposited on the device 80 surface and subsequently etched to define the desired electrode pattern. In the present example, a layer of aluminum is evaporated onto the device 80 surface and subsequently etched to form the metal electrodes 98 and 100 as shown in FIG. 10.

We claim:

1. A method of making electrical contacts on the surface of a semiconductor device; comprising the steps of:

a. attaching said device in electrical contact with a backing plate comprising a first metal which it is desired to deposit and said surface for said contacts;
b. establishing a glow discharge in a vacuum system with said surface of said device and said backing plate being the target of said glow discharge to simultaneously sputter etch said surface and said backing plate to remove impurities from said surface and to deposit said first metal so that a thin alloy region of said first metal and said semiconductor is formed on said surface; and,
c. depositing by sputtering at least one layer of a second metal on said alloy region.

2. A method of making electrical contacts as in claim 1, where said sputter etching back scatters about 5 to 10 monolayers of said first metal into said surface and forms a thin alloy region having a thickness of about 50A.

3. A method of making electrical contacts as in claim 1, where said surface and said metal backing plate are radio frequency sputter etched.

4. A method of making electrical contacts as in claim 1, where said semiconductor is silicon and said first metal backing plate is platinum.

5. A method of making electrical contacts as in claim 1, where said at least one layer of first metal is vacuum deposited on said alloy region.

6. A method of making electrical contacts as in claim 1 wherein said semiconductor has a low-impurity doping level and said alloy region forms a Schottky-barrier contact with said semiconductor.

7. A method of making electrical contacts on a surface of a semiconductor device coated with a layer of insulating material having semiconductor contact openings through said layer; comprising the steps of:

a. attaching said device in electrical contact with a backing plate comprising a first metal which it is desired to deposit and said surface for said contacts;
b. establishing a glow discharge in a vacuum system with said surface of said device and said backing late being the target of said glow discharge discharge to simultaneously sputter etch said surface and said backing plate to remove impurities from said surface and to deposit said first metal so that a thin alloy region of said first metal and said semiconductor is formed on said surface;
c. depositing by sputtering said least one layer of a second metal on said surface and said alloy regions; and,
d. removing portions of said metal layer to electrode leads for said device.

8. A method of making electrical contacts as in claim 7, wherein said sputter etching back scatters about 5 to 10 monolayers of said first metal into said semiconductor contact openings and forms thin alloy regions having a thickness of about 50A.

9. A method of making electrical contacts as in claim 7, wherein said surface and said metal backing plate are radio frequency sputter etched.

10. A method of making electrical contacts as in claim 7, where said semiconductor is silicon and said backing plate is platinum.

11. A method of making beam-lead contacts as in claim 7, where consecutive layers of titanium and platinum are sputter deposited on said surface and said alloy regions, and one or more layers of gold are electroplated thereon.

12. A method of making electrical contacts as in claim 7, where at least some of said contact openings contain a low impurity doping level semiconductor material in which said alloy regions form Schottky-Barrier contacts.

* * * * *